F. W. CREECH.
WASHING TANK FOR PRINTS AND NEGATIVES.
APPLICATION FILED OCT. 2, 1911.
1,035,540.
Patented Aug. 13, 1912.
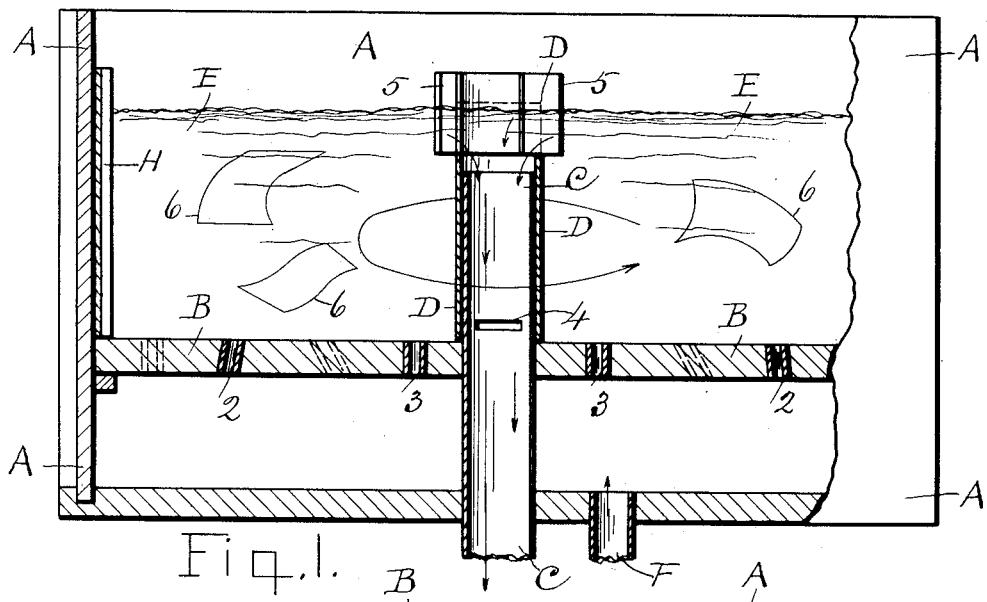
Fig. I.
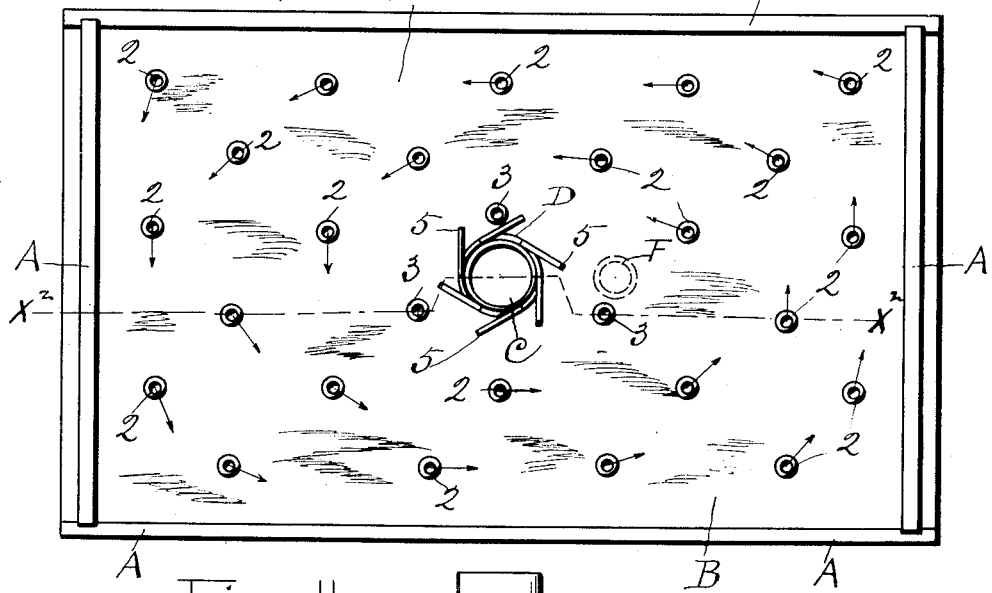
Fig. II.
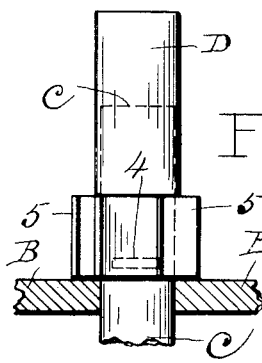
Fig. III.
Witnesses.
Chas G. entle
H. G. Hendry
Inventor.
Frederick W. Creech.
By John H. Hendry
His Attorney

UNITED STATES PATENT OFFICE.

FREDERICK W. CREECH, OF FORT WILLIAM, ONTARIO, CANADA.

WASHING-TANK FOR PRINTS AND NEGATIVES.

1,035,540.  Specification of Letters Patent.  Patented Aug. 13, 1912.

Application filed October 2, 1911. Serial No. 652,416.

*To all whom it may concern:*

Be it known that I, FREDERICK W. CREECH, a subject of the King of Great Britain, and resident of Fort William, in the district of Thunder Bay and Province of Ontario, Canada, have invented new and useful Improvements in Washing-Tanks for Prints and Negatives, of which the following is a specification.

My invention relates to improvements in washing tanks for prints and negatives, in which a tank, having a lower inlet for water under pressure is provided with a horizontal plate secured a distance above said inlet, and through which are small tubes at an angle therewith, to admit equalized water under pressure into the tank, thereby causing a revolving whirling motion to the water, and a centrally located overflow and discharge tube in the tank, adapted to receive water therefrom and to discharge the same.

The objects of my invention are, first, to provide means for creating a revolving whirl, or agitating motion to water in a tank, in order that prints, or prints and negatives placed therein may be thoroughly washed; second, to provide means whereby the prints placed in a water tank may be propelled by the water to travel around the tank about once in every eight or ten seconds, and simultaneously to effect an entire change or renewal of water in the tank, say, every four minutes; third, to provide means for thoroughly washing prints, photographs, without handling them, in the cold water, fourth, to provide means for gradually renewing the water simultaneously with the washing of the prints, and effective means for emptying the tank.

I attain these objects by the device illustrated in the accompanying drawing, in which:—

Figure 1, is a sectional elevation of the washing tank through the broken irregular line X², X², in Fig. 2 of the drawing, and showing a portion of the front side of the tank broken. Fig. 2 is a plan, showing particularly the series or the plurality, of small tubular water ways through a stationary plate of the tank, together with the centrally located discharge pipe and the reversible winged tube, the skeleton rack H being omitted. Fig. 3 is an elevation of the reversible winged tube, reversed on the discharge tube, in order that the water may be drained from the tank through a side opening in said discharge pipe.

Similar characters of reference refer to similar parts throughout the several views.

In the drawing, the water tank proper is indicated by A, and B is a horizontal plate, located one third, more or less, of the distance, from the bottom to the top of the tank. The plate B, is stationary in the tank, and is provided with a plurality of small tubes 2 secured thereto, and preferably at an angle of eighty degrees to said plate, and the similar tubes 3 which are nearest to the central part of the plate are preferably perpendicular through said plate.

C, is a discharge pipe centrally located and rigidly secured to the tank, and extends a distance below the bottom thereof, and to a distance above the perforated plate B.

4 is a small opening in the tube, immediately above the plate B, and is for the purpose of emptying the tank, when necessary.

D, is an outer reversible tube, which telescopes on the stationary discharge pipe, and rests on the plate B, the upper end extends above the stationary discharge pipe, and is provided with a plurality of wings 5, which extend from the upper end part thereof, and above, and at suitable angles to said sides. The wings 5, on the top of the outer tube D, allow the water K into the discharge pipe C, without causing the whirling suction and prevent the prints from being drawn into the pipe, as shown more clearly in Fig. 2 of the drawing.

Fig. 3 of the drawing shows the reversible tube D, reversed, or upside down, for the purpose of draining the water from the tank above the plate B. The wings on the reversible tube, when said tube is in reversed position, prevent the prints from being drawn into too close proximity with the water outlet opening 4, and blocking up said opening. For the purpose intended, I prefer to build the tank of an oblong shape, though other shapes would answer the purpose.

The prints in the water are indicated by 6, and the large arrow in Fig. 1 indicates the direction of the whirl of the water. The smaller arrows in Figs. 1 and 2, indicate the direction of the flow of the water.

F is an inlet pipe in the bottom of the tank to admit water under pressure into said tank, and said water in said tank flows through the inlet tubes 2 and 3, and rests on the plate B. Negatives can be set in a small skeleton rack H at one or both ends of the tank and resting on the plate B.

It will be noticed that when the slidable tube D, is reversed that the now lower end of the tube is above the opening 4, of the discharge pipe, thereby allowing the water to flow freely through said opening and into the discharge pipe. Skeleton racks H are common, and of various shapes and forms.

What I claim as my invention and desire to secure by Letters Patent, is:—

1. A washing tank for prints and negatives, an inlet pipe for water under pressure in the lower part thereof, a horizontal plate having a plurality of inlets for water under pressure at angles with the said plate secured in the tank above said pipe, said inlets adapted to impart a revolving whirl to the water in the tank above said plate.

2. A washing tank for prints and negatives, an inlet pipe for water under pressure communicating with the lower part thereof, a horizontal plate located and secured in the tank, and above said inlet pipe, a plurality of tubes, at an angle to the plate, and extending therethrough, adapted to receive and to discharge water under equal pressure into the tank and thereby to impart a revolving whirl to the water above said plate.

3. In a washing tank for prints and negatives, a water tank, an inlet for water under pressure therein, a plate having tubes at an angle therewith, secured therein above said inlet, a centrally located vertical discharge pipe, one end extending above the plate and the opposite end extending beyond the tank, and having an opening therein, in close proximity to the plate, a reversible tube on said discharge pipe resting on the plate and covering said opening, the opposite end thereof extending above the discharge pipe, and means on said tube to prevent prints from being drawn into and blocking said opening, when said tube is reversed, in order to empty the tank above said plate.

4. A washing tank for prints and negatives, an inlet for water under pressure therein, a plate above said inlet, having a plurality of water inlet tubes at angles to the plate and extending through the same, adapted to impart a revolving whirl and commotion to the water in the tank above said plate, a centrally located discharge pipe one end extending above the plate and the opposite and lower end extending beyond the tank, said pipe having an opening in proximity to the top of the plate, a reversible tube adapted to slide on said pipe and cover said opening, and means on the tube to prevent prints from being drawn into and blocking said opening in the discharge pipe, when said tube is reversed.

FREDERICK W. CREECH.

Witnesses:
 FRED. BABE,
 GEO. R. EVANS.